(12) United States Patent
Weddington et al.

(10) Patent No.: US 7,137,660 B2
(45) Date of Patent: *Nov. 21, 2006

(54) CONVERTIBLE TOP FOR AN ALL-TERRAIN VEHICLE

(75) Inventors: John T. Weddington, Cross Lanes, WV (US); Raymond L. Miller, Cross Lanes, WV (US)

(73) Assignee: Rain Riders, LLC, Charleston, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/382,123

(22) Filed: May 8, 2006

(65) Prior Publication Data

US 2006/0192403 A1    Aug. 31, 2006

Related U.S. Application Data

(63) Continuation-in-part of application No. 10/894,574, filed on Jul. 20, 2004, now Pat. No. 7,066,526.

(51) Int. Cl.
*B62D 25/06* (2006.01)

(52) U.S. Cl. ................. 296/105; 296/77.1; 296/78.1

(58) Field of Classification Search ............... 296/104, 296/105, 107.19, 79, 78.1, 77.1, 83, 136.01, 296/136.1, 136.11; 150/167, 166, 168; 135/115, 135/87, 88.01, 88.05, 88.09, 88.13, 88.14
See application file for complete search history.

(56) References Cited

U.S. PATENT DOCUMENTS

| | | | | |
|---|---|---|---|---|
| 4,950,017 | A | * | 8/1990 | Norton ...................... 296/77.1 |
| 4,973,082 | A | * | 11/1990 | Kincheloe ................... 280/756 |
| 5,174,622 | A | * | 12/1992 | Gutta ........................ 296/77.1 |
| 5,388,881 | A | * | 2/1995 | Spencer et al. ............. 296/77.1 |
| 6,397,916 | B1 | * | 6/2002 | Bengtsson et al. ........ 160/84.06 |
| 6,402,220 | B1 | * | 6/2002 | Allen ......................... 296/77.1 |
| 6,481,487 | B1 | * | 11/2002 | Simon ..................... 160/84.06 |
| 6,543,830 | B1 | * | 4/2003 | Stuck ........................ 296/77.1 |
| 6,565,139 | B1 | * | 5/2003 | Bayerle et al. ............. 296/77.1 |
| 6,817,647 | B1 | * | 11/2004 | Green ........................ 296/77.1 |
| 2002/0089207 | A1 | * | 7/2002 | Bayerle et al. ............. 296/77.1 |

* cited by examiner

*Primary Examiner*—Lori L. Coletta
(74) *Attorney, Agent, or Firm*—Adams Evans P.A.

(57) ABSTRACT

A convertible protective top for a vehicle. The top including a retractable canopy and at least two mounting brackets. The canopy includes at least two spaced-apart side members; at least two spaced-apart cross-members, and a cover attached to the cross-members. The cross-members are positioned between and slidably engaged with the side members, wherein the cross-members and cover are moved along the side members to retract the cover. The mounting brackets are attached to a front end and a rear end of the vehicle. Each of the mounting brackets include at least two vertical tubular members for receiving respective ones of the side members for securing the canopy to the vehicle.

28 Claims, 22 Drawing Sheets

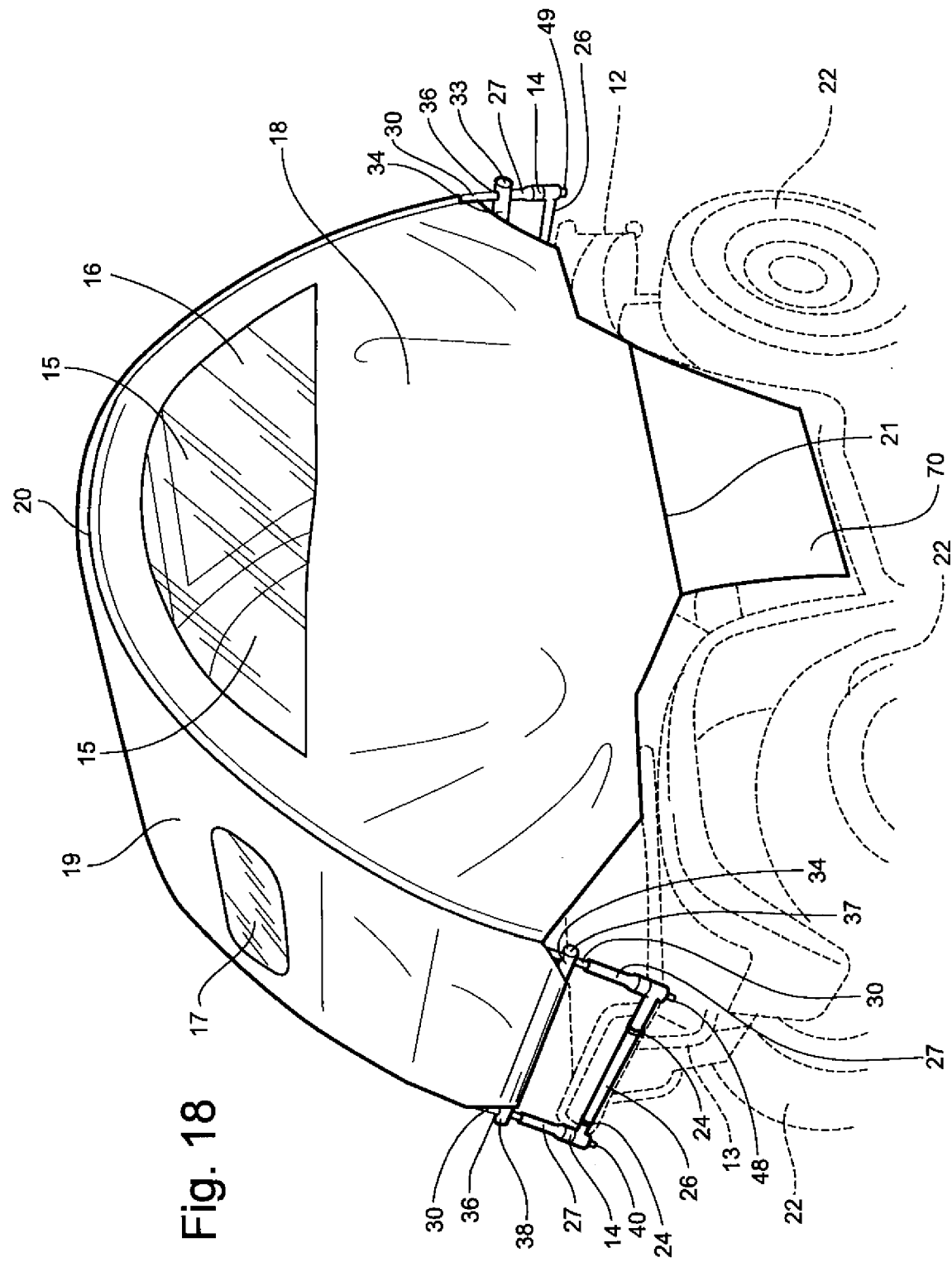

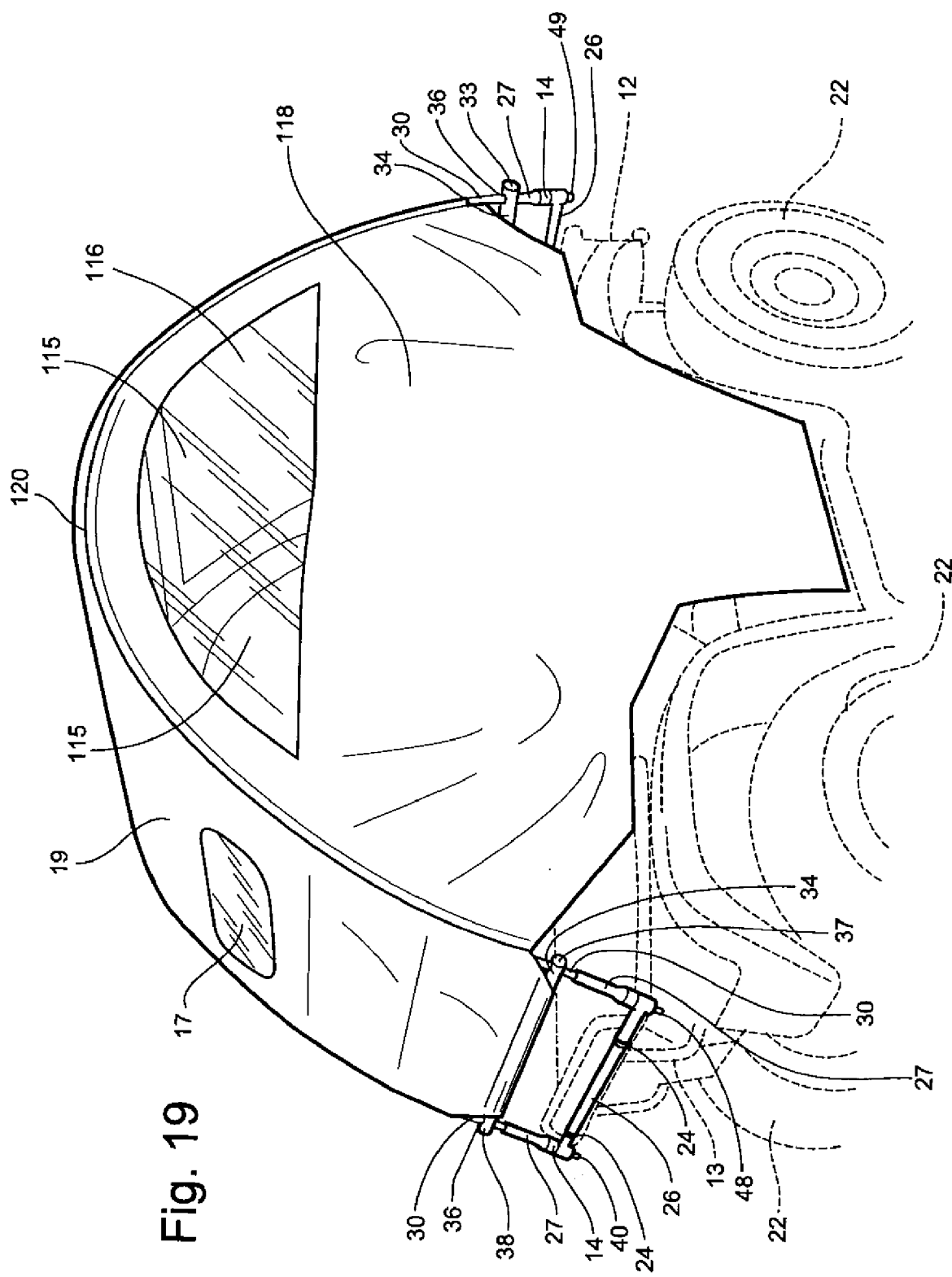

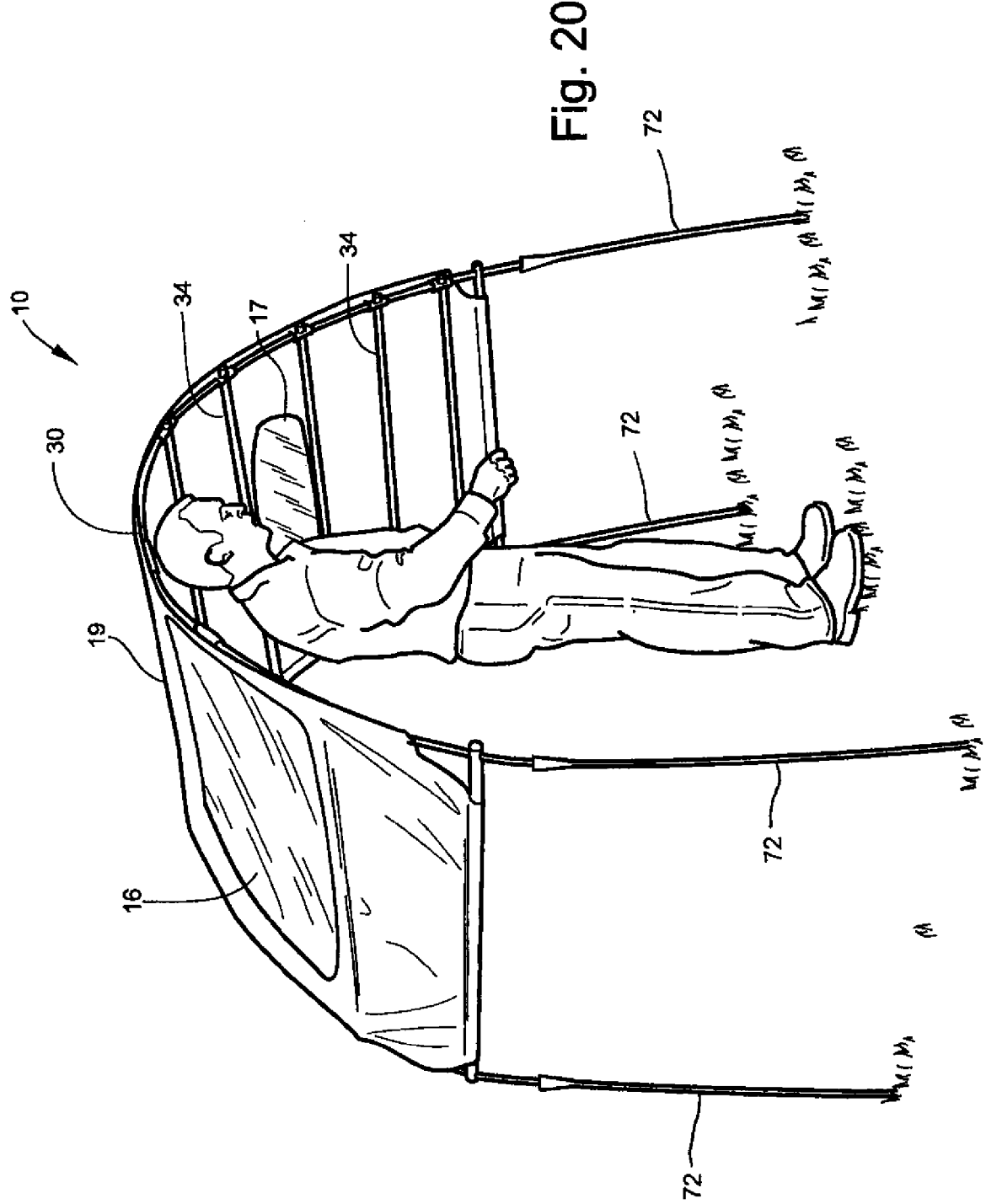

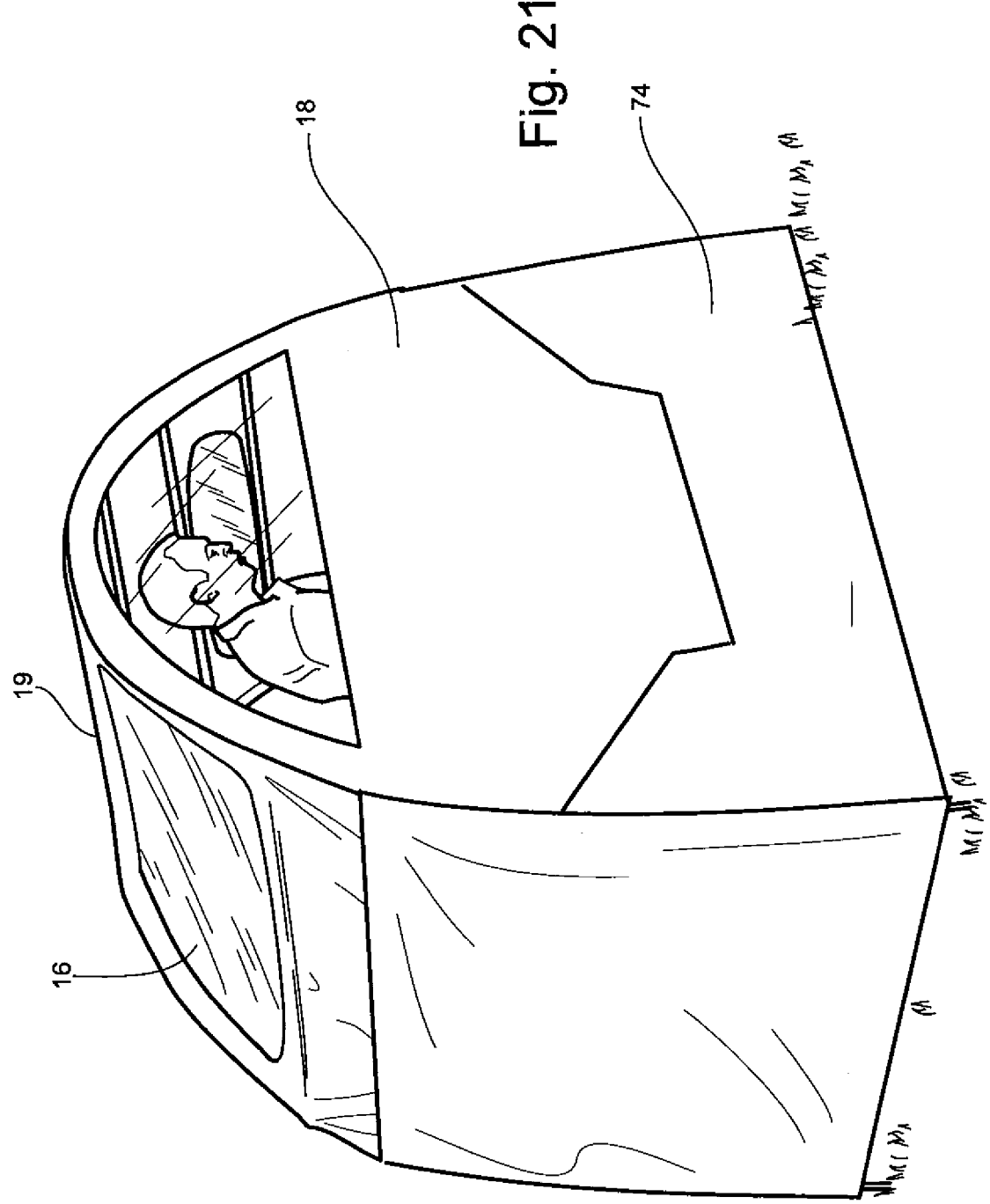

CONVERTIBLE TOP FOR AN ALL-TERRAIN VEHICLE

This application is a continuation-in-part of application Ser. No. 10/894,574 filed on Jul. 20, 2004 now U.S. Pat. No. 7,066,526.

TECHNICAL FIELD AND BACKGROUND OF THE INVENTION

This invention relates to protective enclosures for vehicles, and more particularly to a convertible protective enclosure for an all-terrain vehicle (ATV) to provide an operator of the ATV with protection from various environmental elements, such as rain or snow. Additionally, the invention relates to a convertible protective enclosure that can be removed from the ATV to provide shelter.

ATVs have become increasingly popular in recent years as both recreational vehicles and utility vehicles. Unlike a passenger automobile, an ATV is similar to a motorcycle in that it has no protected enclosure for the operator.

Convertible tops for automobiles are well-known in the art. These tops may be retracted manually or with the help of a power assist, and are generally rigid and fixedly attached at a rear end of the automobile, preventing easy removal of the top. Additionally, these tops are moveable between only two positions, open and closed. Convertible tops used on automobiles are very practical for their intended use, however, they are not practical for use on an ATV.

U.S. Pat. Nos. 6,543,830 and 6,402,220 describe a protective enclosure for use on an ATV. U.S. Pat. No. 6,543,830 describes a removable cab assembly provided in a portable kit form. The cab assembly includes flexible framework, a flexible fabric cover, a pair of side doors, and a deflector shield.

U.S. Pat. No. 6,402,220 also discloses a portable enclosure. The portable enclosure is formed of support beams, side panels, front and rear panels, and a top panel. The support beams form a skeleton over the top of the ATV upon which the panels are fastened.

The aforementioned patents do not describe a protective enclosure for an ATV that has a convertible top that can be stowed on the ATV without removing the entire skeletal structure of the protective enclosure.

Accordingly, the present invention addresses these problems by providing a convertible top that is easily stowed on the ATV and may be used in multiple applications, providing an operator with protection from various environmental elements.

SUMMARY OF THE INVENTION

Therefore, it is an object of the invention to provide a convertible top for use with an ATV.

It is another object of the invention to provide a convertible top that is easily removed from the ATV.

It is another object of the invention to provide a convertible top that can be used as a tent.

It is another object of the invention to provide a convertible top that is sufficiently flexible to be deflected by contact with brush and limbs and return to its use position.

It is another object of the invention to provide a convertible top that is selectively adjustable to a plurality of use positions.

These and other objects of the present invention are achieved in the preferred embodiments disclosed below by providing a convertible protective top for being attached to a vehicle. The convertible protective top including a retractable canopy, the canopy including at least two spaced-apart side members; at least two spaced-apart cross-members, wherein the cross-members are positioned between and slidably engaged with the side members; and a cover attached to the cross-members, wherein the cross-members and cover are moved along the side members to retract the cover. The convertible protective top also including at least two mounting brackets for being attached to a front end and a rear end of the vehicle, each of the mounting brackets including at least two vertical tubular members for receiving respective ones of the side members and securing the canopy to the vehicle.

According to another preferred embodiment of the invention, the cross-members include at least one hole positioned on opposing ends of the cross-members for allowing the cross-members to slidably engage the side members.

According to another preferred embodiment of the invention, the cover further includes at least one fastener disposed on each of a pair of opposing side edges for attaching a side curtain to each side edge and forming an enclosure.

According to another preferred embodiment of the invention, the at least one fastener is selected from the group consisting of a zipper, a button, and a snap.

According to another preferred embodiment of the invention, the cover further includes at least one connecting means positioned on each of a pair of opposing side edges for slidably attaching the cover to the side members.

According to another preferred embodiment of the invention, the at least one connecting means includes a hole transverse to the connecting means for receiving a respective one of the cross-members and allowing a respective one of the side members, the connecting means, and the cross-member to be connected together.

According to another preferred embodiment of the invention, the connecting means is selected from the group consisting of a ring, a pocket, and a loop.

According to another preferred embodiment of the invention, the side members are flexible for allowing the canopy to have an arcuate shape.

According to another preferred embodiment of the invention, the side members are made of a flexible rod.

According to another preferred embodiment of the invention, the side members are made of a plurality of rod segments connected by shock cords According to another preferred embodiment of the invention, the side members are secured to the mounting bracket by a cotter pin.

According to another preferred embodiment of the invention, the cover includes a front window and a rear window for providing an operator of the vehicle with a clear view.

According to another preferred embodiment of the invention, A convertible protective top for being attached to a vehicle, including an arcuate retractable canopy. The canopy including at least two spaced-apart flexible side members; a plurality of spaced-apart cross-members positioned between the side members, the cross-members having a hole positioned on opposing ends of the cross-members for slidably engaging the side members, wherein the side members are slid through the holes; and a cover including opposing side edges and opposing end edges, wherein each of the opposing side edges is slidably attached to a respective one of the side members by at least one pocket, and wherein each of the opposing end edges is attached to a respective one of the cross-members. The convertible protective top also including at least two mounting brackets for being attached to a front end and a rear end of the vehicle, each of the mounting brackets including at least two vertical tubular members for receiving respective ones of the side members and securing the canopy to the vehicle.

According to another preferred embodiment of the invention, the cover further includes a zipper disposed on each of the opposing side edges for attaching a side curtain to each side edge and forming an enclosure.

According to another preferred embodiment of the invention, a convertible protective top for being attached to a vehicle including an arcuate retractable canopy. The canopy including at least two spaced-apart flexible side members; a plurality of spaced-apart cross-members positioned between the side members, the cross-members having a hole positioned on opposing ends of the cross-members for slidably engaging the side members, wherein the side members are slid through the holes; and a rectangular cover slidably attached to the side members, the cover having a plurality of pockets attached to opposing side edges of the cover for securing each of the side edges to a respective one of the side members, each of the pockets has a hole transverse to the pocket for receiving a respective one of the cross-members for allowing the side members, pockets, and cross-members to be connected together. The convertible protective top also includes at least two mounting brackets for being attached to a front end and a rear end of the vehicle, each of the mounting brackets including at least two vertical tubular members for receiving respective ones of the side members and securing the canopy to the vehicle.

According to another preferred embodiment of the invention, a method of attaching a convertible protective top to a vehicle, including the steps of providing a retractable canopy. The canopy including at least two spaced-apart side members; at least two spaced-apart cross-members, wherein the cross-members are positioned between and slidably engaged with the side members; and a cover attached to the cross-members, wherein the cross-members and cover are moved along the side members to retract the cover. The method also including the step of providing at least two mounting brackets and attaching the mounting brackets to a front end and a rear end of the vehicle. The mounting brackets include at least two vertical tubular members for receiving respective ones of the side members. The method also includes the step of sliding opposing ends of each side member through an opening of respective ones of the vertical tubular members positioned at the front end and rear end of the vehicle, and inserting a connecter through a hole in the opposing ends of each side member.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 18 shows a side extension attached to the side curtain of FIG. 3;

FIG. 19 shows the convertible top of FIG. 1 with a side curtain according to another embodiment of the invention;

FIG. 20 shows the convertible top of FIG. 1 with extension rods; and

FIG. 21 shows the convertible top of FIG. 20 with a side skirt.

DESCRIPTION OF THE PREFERRED EMBODIMENT AND BEST MODE

Figure 1:
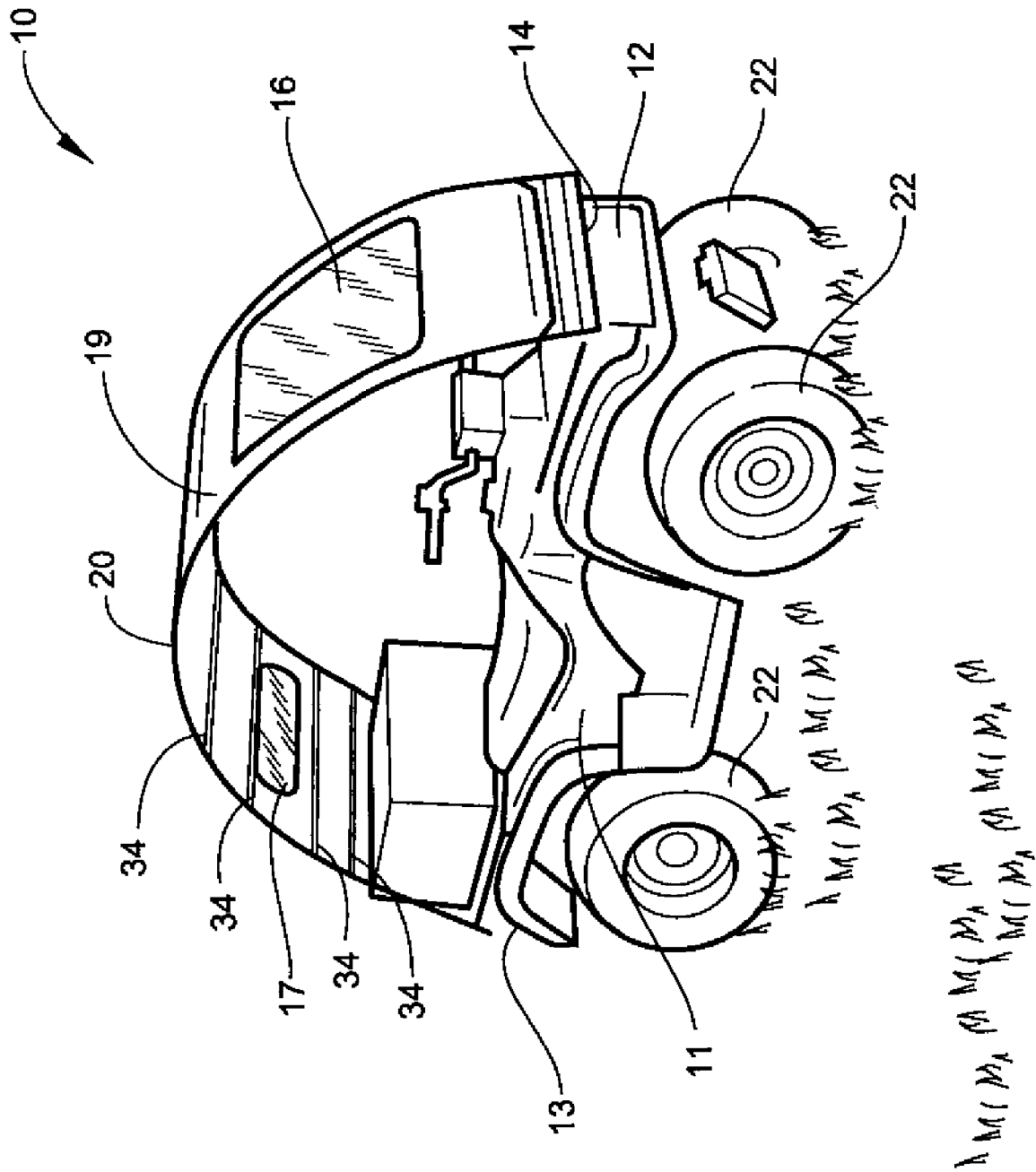
FIG. 1 shows an environmental perspective view of the convertible top attached to an ATV.
Figure 2:
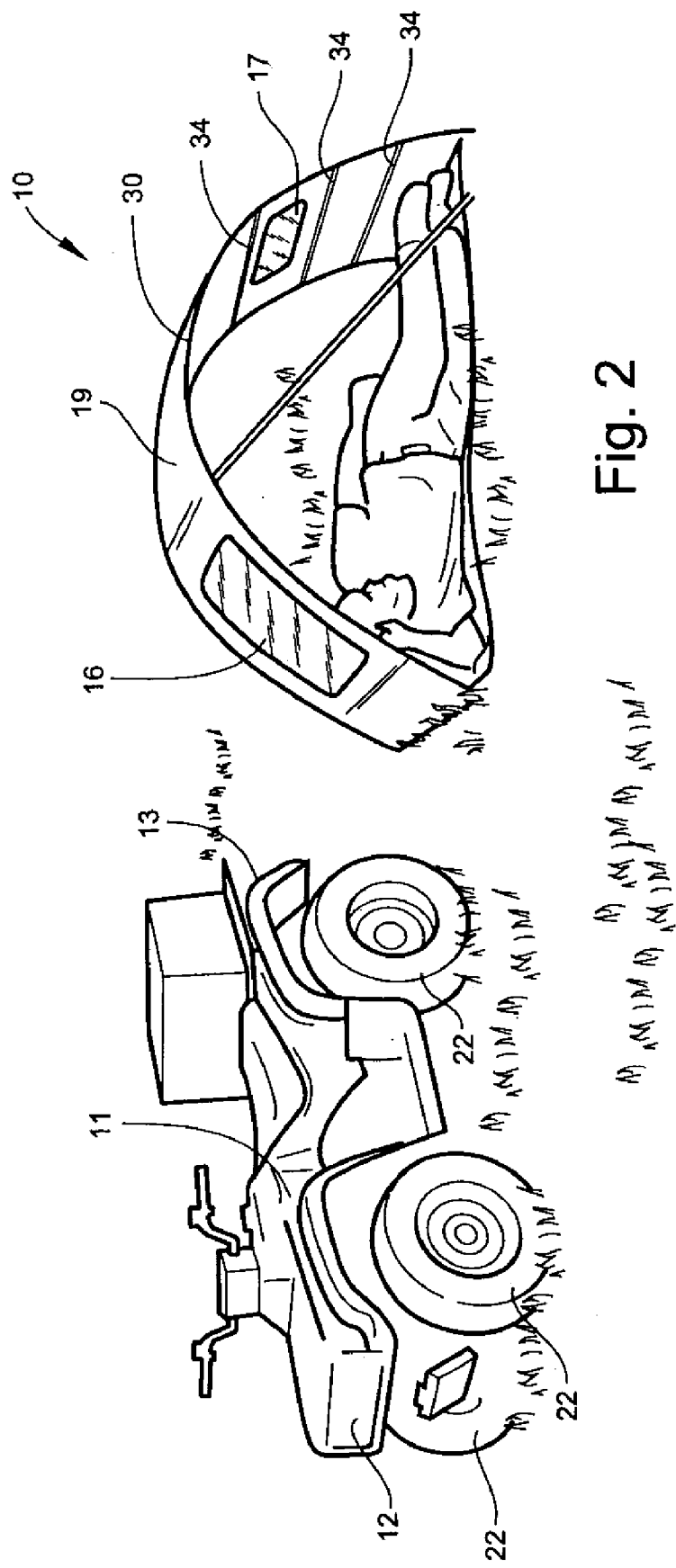
FIG. 2 shows an environmental perspective view of the convertible top removed from the ATV and used as a tent.
Figure 3:
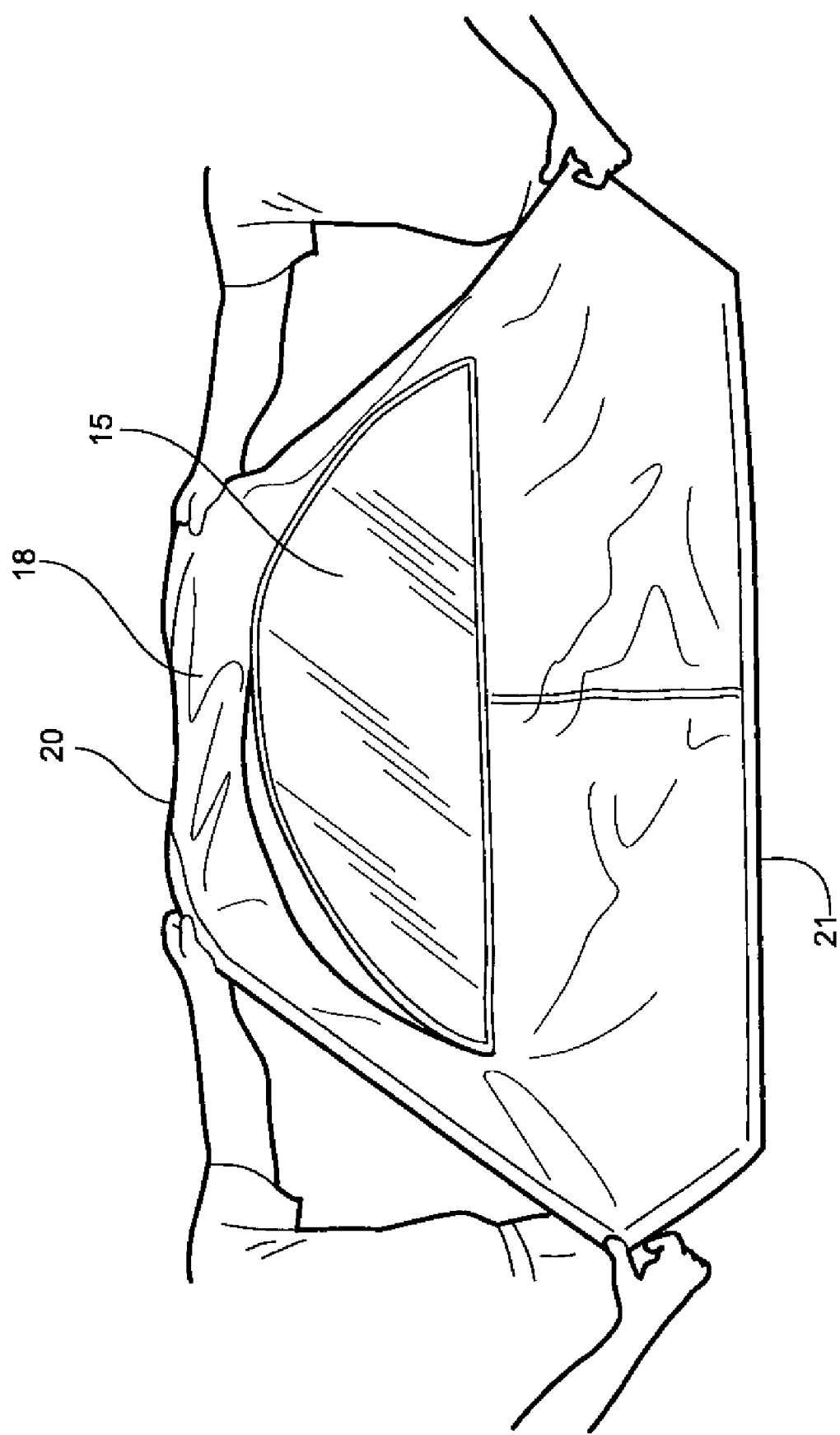
FIG. 3 shows an optional side curtain of the convertible top.
Figure 4:
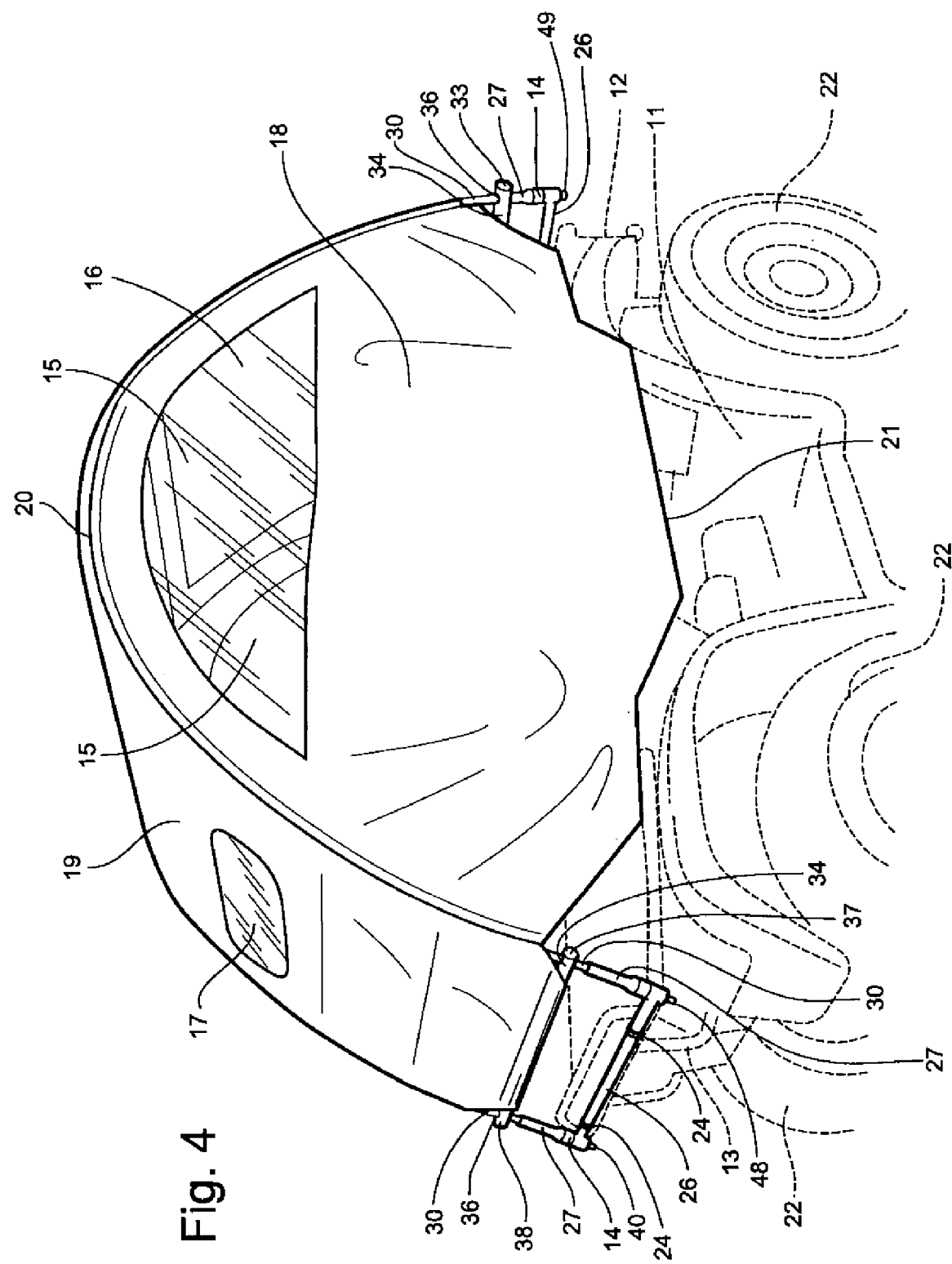
FIG. 4 shows a side view of the convertible top with its side curtains attached to the ATV.
Figure 5:
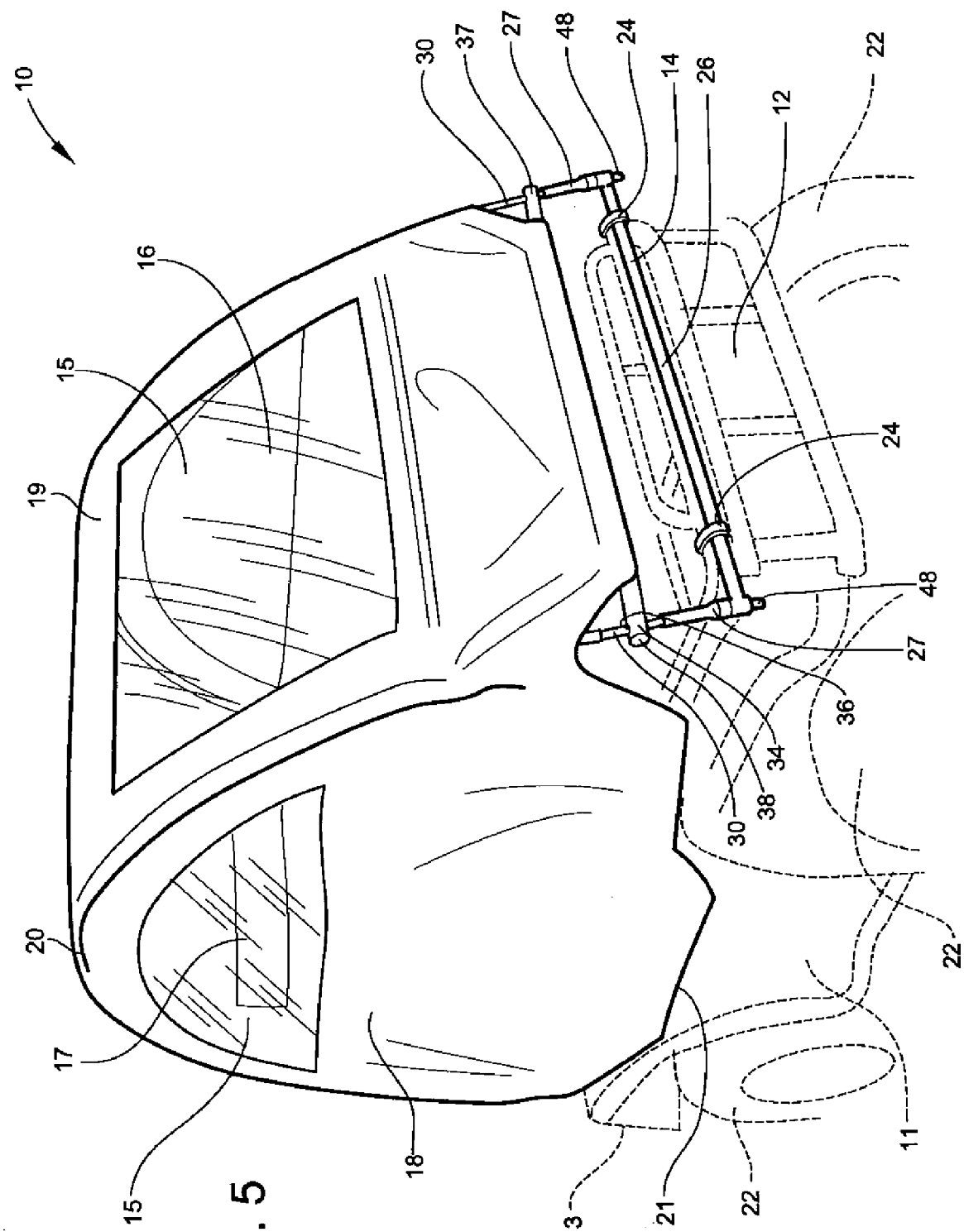
FIG. 5 shows a front view of the convertible top with its side curtains attached to the ATV.

Referring to FIGS. 1 and 2, the present invention generally includes a convertible protective top 10 for use on an all-terrain vehicle (ATV) 11. The convertible top 10 is attached to a front end 12 and a rear end 13 of the ATV 11 via an attachment means such as a mounting bracket 14, forming an arcuate top for providing an operator of the ATV 11 complete coverage and protection from environmental elements, such as rain, snow, wind, and contact with brush and limbs.

The convertible top 10 extends an entire length of the ATV 11 from the front end 12 to the rear end 13 to provide protection for the entire top area of the ATV 11. By extending the convertible top 10 the entire length of the ATV 11, the convertible top 10 can provide protection for stowed cargo as well as the operator. The convertible top 10 includes a front window 16 and a rear window 17 to provide the operator of the ATV 11 with a clear view when the convertible top 10 is in its extended use position.

The convertible top 10 may also be used as a tent or an emergency shelter, as illustrated in FIG. 2. The convertible top 10 is, thus, designed to be easily detached from the ATV 11 in its extended configuration. Using the convertible top 10 as a tent is particularly useful on camping trips, as it eliminates the need to carry additional equipment to the campsite and eliminates the time consumed in assembling a tent. The convertible top 10 is also particularly useful as an emergency shelter, since the convertible top 10 can be quickly detached from the ATV 11 to provide a shelter to the operator in the event a fast moving weather front emerges.

Referring to FIGS. 3, 4, 5, and 6, side curtains 18 may be attached to a canopy 19 of the convertible top 10 to form an enclosure around the ATV 11. The side curtains 18 include a side window 15 and are designed to be attached to the canopy 19 in its extended use position. The top 20 of each side curtain 18 has a shape to match the arcuate shape of the canopy 19. The bottom 21 of each side curtain 18 follows the contours of the fenders and foot well of the ATV 11, eliminating any interference with the ATV's tires 22.

Figure 6:
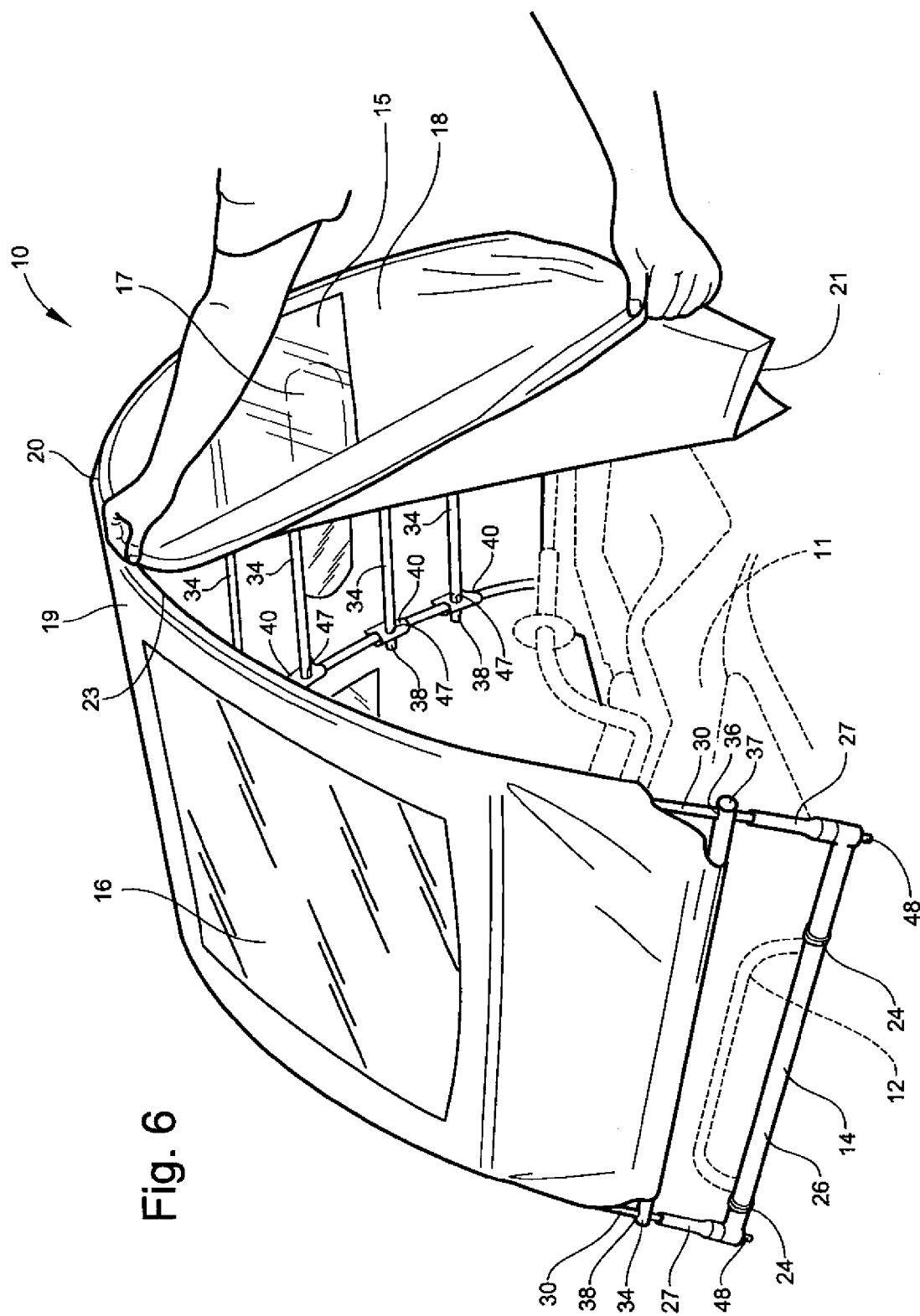
FIG. 6 shows the removal of the side curtains from the canopy of the convertible top.

The side curtains 18 are attached to the canopy 19 using fasteners 23, such as a zipper, as illustrated in FIG. 6, a plurality of buttons, a plurality of snaps, or any other suitable fasteners which allow the side curtains 18 to be securely attached to or removed from the canopy 19, as needed.

Figure 7:
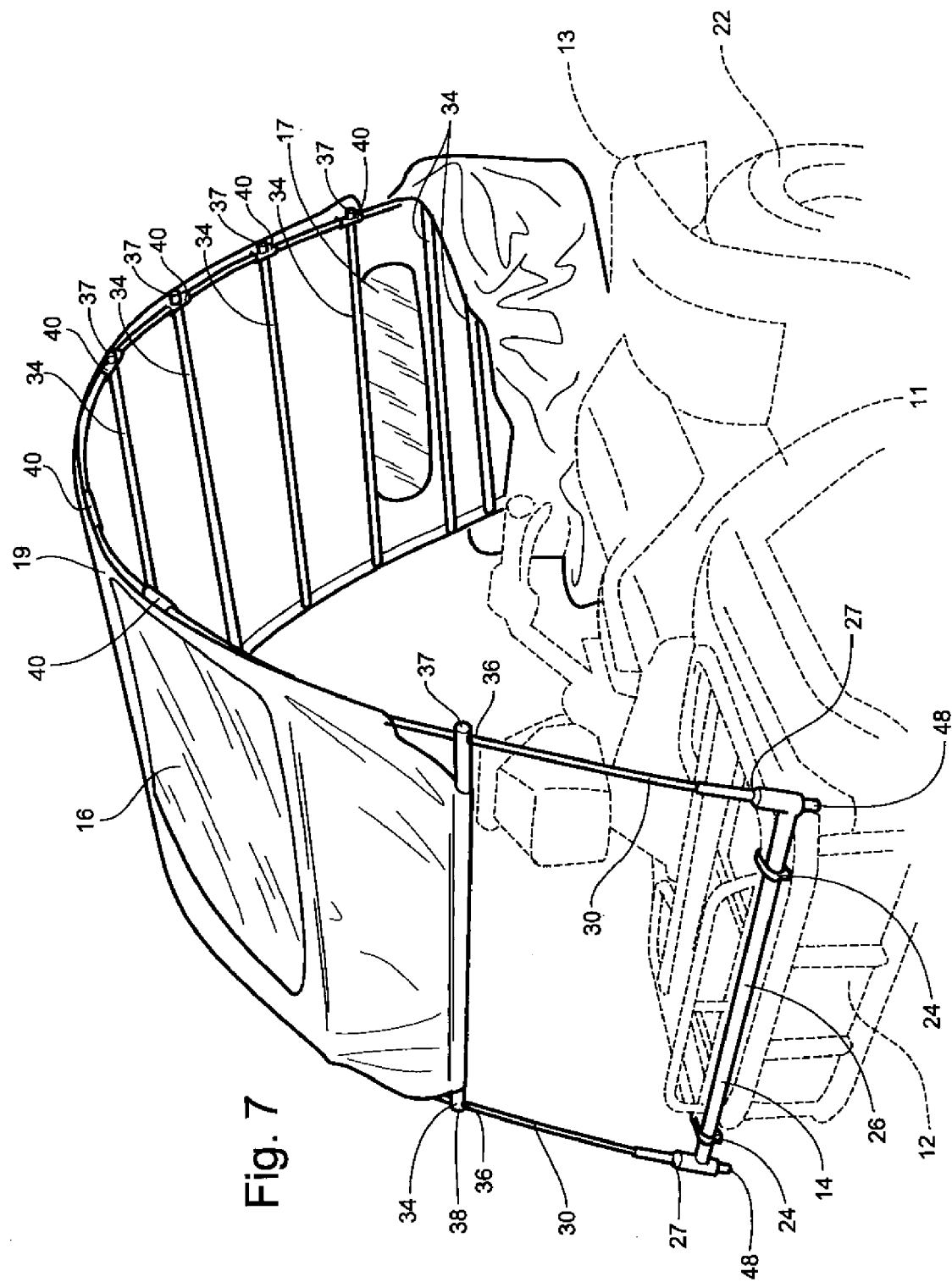
FIG. 7 shows the convertible top with the side curtains removed and the front of the convertible top partially retracted to one of a plurality of use positions.
Figure 15:
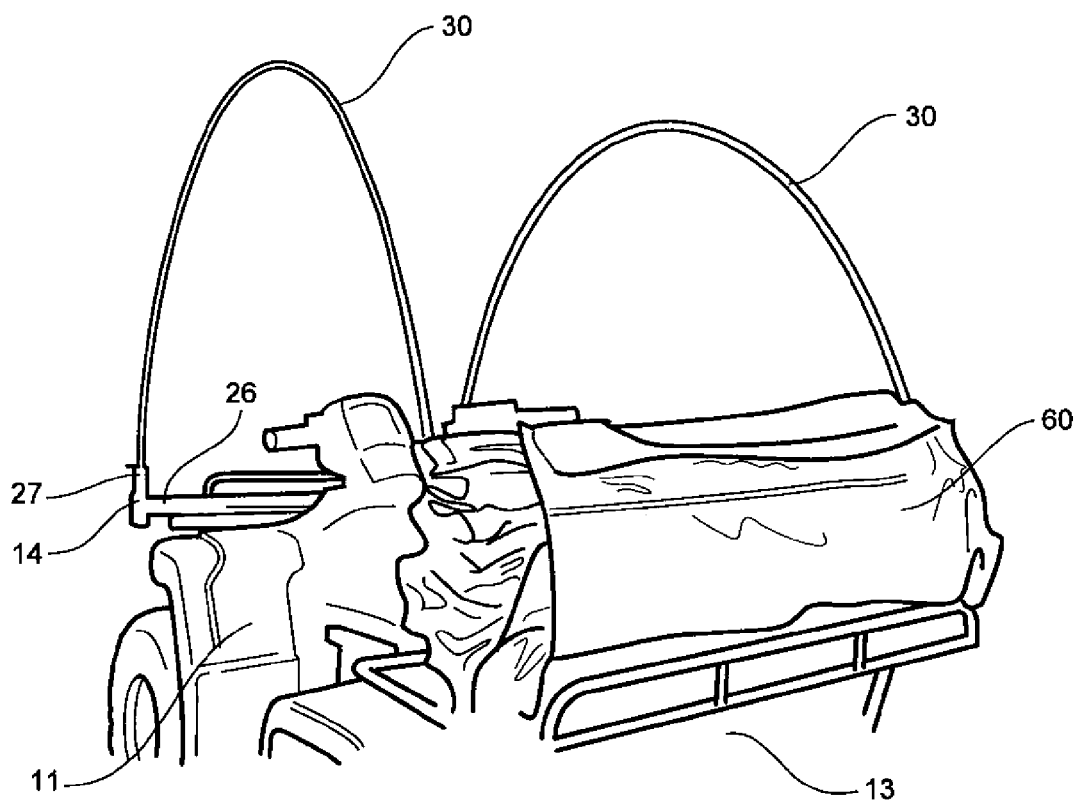
FIG. 15 shows the convertible top fully retracted and in a storage position with a storage cover wrapped around the convertible top.

With the side curtains 18 removed, the canopy 19, as illustrated in FIGS. 7 and 15, can be retracted. The canopy 19 may be retracted from the front end 12 of the ATV 11 to the rear end 13 of the ATV 11 or from the rear end 13 of the ATV 11 to the front end 12 of the ATV 11. Unlike a convertible top for an automobile, the canopy 19 can be retracted to several positions along its arcuate shape between the front and rear ends 12 and 13 of the ATV 11.

The ability to retract the canopy 19 to several positions allows the operator of the ATV 11 to adjust the amount of protection the canopy 19 provides. For example, on a mild overcast day, the operator may want to fully retract the canopy 19. On a hot sunny day, the operator may want to retract the canopy 19 only half way, providing the operator with protection from the sun, while allowing fresh air to flow onto the operator from the front. In either of these examples, the canopy 19 still provides protection from branches, spider webs, and other debris.

Figure 8:
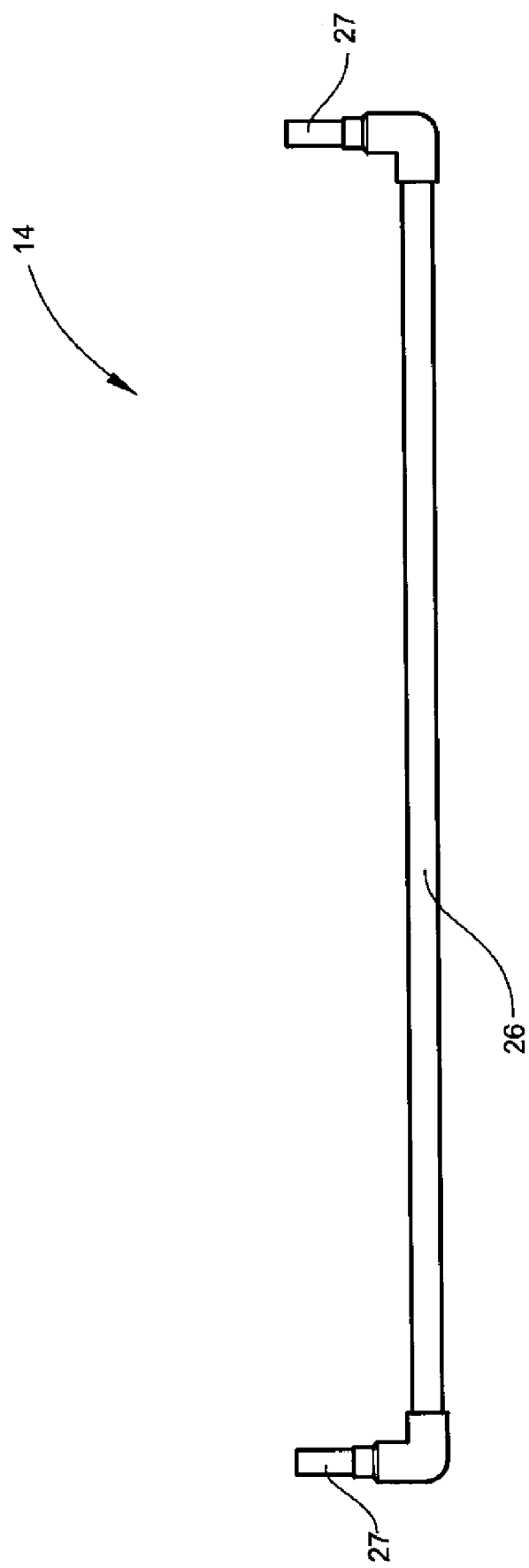
FIG. 8 shows an attachment means for attaching the convertible top to the ATV.
Figure 13:
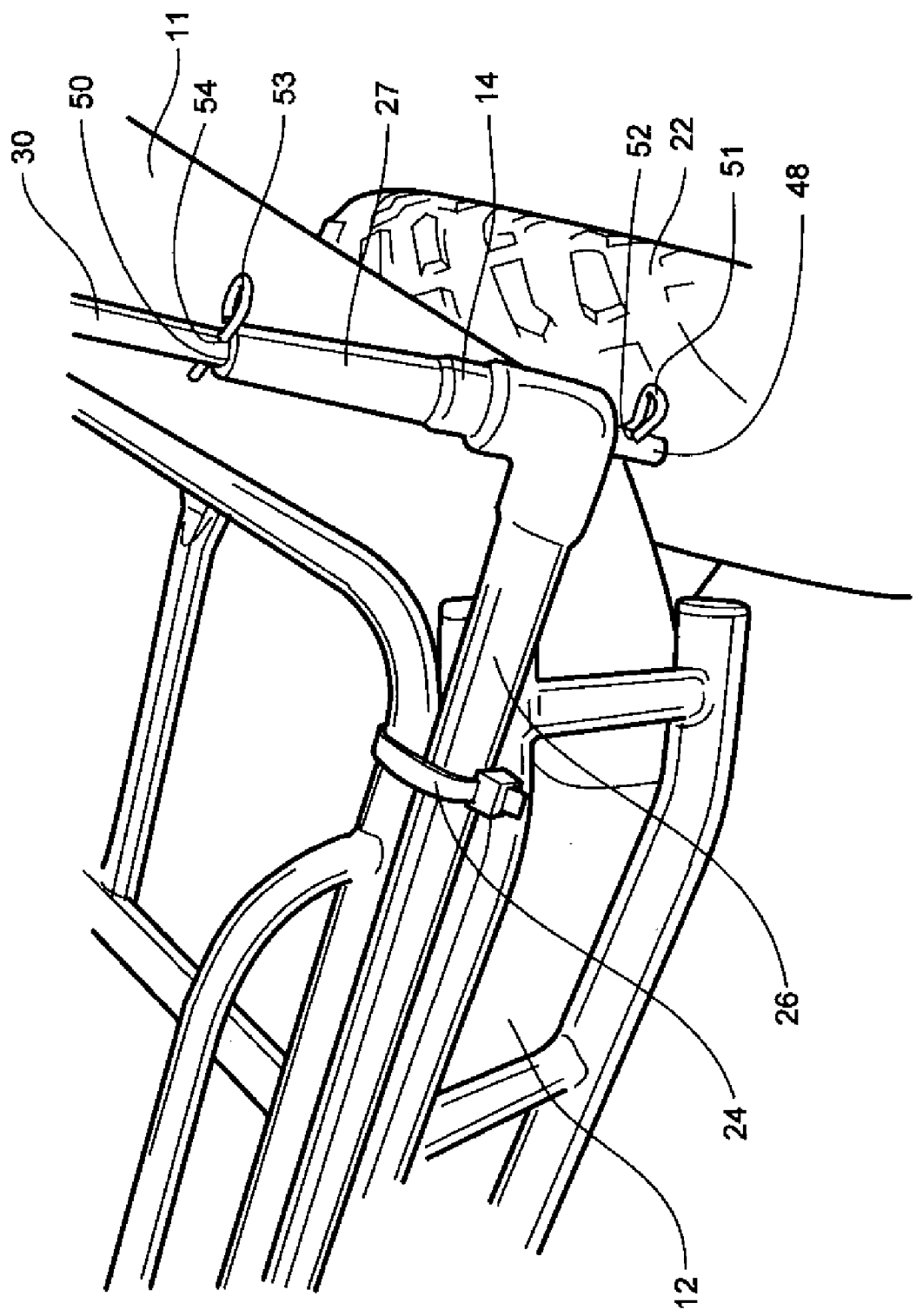
FIG. 13 shows the attachment means secured to a front end of the ATV and an elongated side member of the skeletal frame secured to the attachment means.
Figure 14:
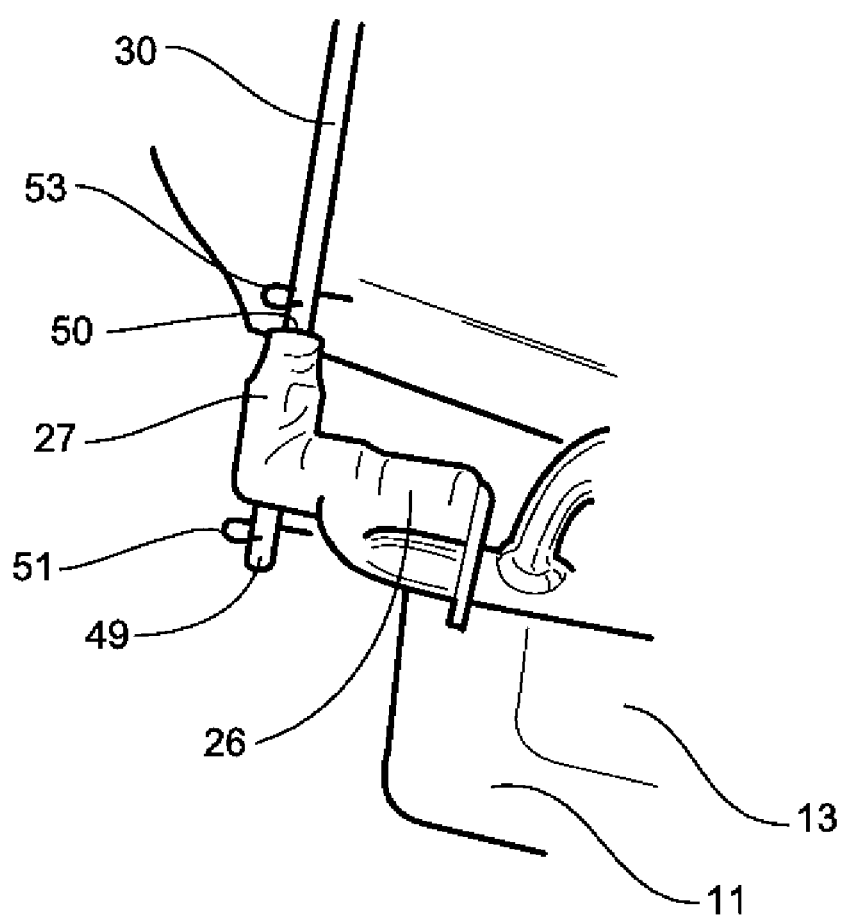
FIG. 14 shows the attachment means secured to a rear end of the ATV and the elongated side member of the skeletal frame secured to the attachment means.

The mounting bracket 14, as shown in FIGS. 8, 13, and 14, is attached to the front and rear ends 12 and 13 of the ATV 11 via fasteners 24. The fasteners 24 may include U-shaped clamps, C-shaped clamps, plastic ties, or any other suitable fastener for securely fastening the mounting bracket 14 to the ATV 11.

The mounting bracket 14, as illustrated in FIG. 8, has a U-shaped profile consisting of an elongate horizontal member 26 and a pair of vertical members 27 positioned on opposed ends 28 and 29 of the horizontal member 26. The horizontal member 26 may be tubular or solid, and may have various cross-sectional dimensions and shapes. The vertical members 27 are tubular for accepting an elongate side member 30, as described below, therethrough. Alternatively, the mounting bracket 14 may simply be a pair of vertical tubular members independently attached to the four corners of the front and rear ends 12 and 13 of the ATV 11 for accepting the side members 30, (not shown).

As shown in FIGS. 9, 10, 11, and 12, the canopy 19 is fabricated using a skeletal frame 31 formed of a plurality of elongate members 32 and a rectangular cover 33. The frame 31 includes a pair of elongate side members 30 and a plurality of elongate cross-members 34. The side members 30 are fabricated from flexible rods to allow the canopy 19 to bend into an arcuate shape. The side members 30 may also be fabricated of a segmented rod with a shock cord running therethrough or any other suitable rod to allow the rod to be bent into an arcuate shape. The cross-members 34 are fabricated from a semi-rigid tubular rod, such as PVC pipe. The cross-members 34 include a hole 36 in each of the opposed ends 37 and 38 of the cross-members 34 for accepting the side members 30 passing therethrough. While the side members 30 and cross-members 34 preferably have a circular cross-section, any suitable material or cross-sectional dimension may be used for the side members 30 and cross-members 34.

The rectangular cover 33 is fabricated from a flexible fabric, such as canvas, plastic, or other durable sheet material, to conform to the frame 31. The cover 33 is preferably waterproof and sufficiently durable to resist tearing. The cover 33 includes a connecting means, such as a ring or a pocket 40, positioned along opposed side edges 41 and 42 of the cover 33 for accepting the side members 30 and the cross members 34. The cover 33 may include a plurality of spaced-apart pockets in the form of loops 40, as illustrated, or a single elongated pocket (not shown) running the length of the cover 33 along opposed side edges 41 and 42 for receiving the elongate side members 30. The loops or pockets 40 may be made from the same material as the cover 33, or any other suitable material. The loops or pockets 40 may also be integrated with, or attached to, the cover 33.

Figure 9:
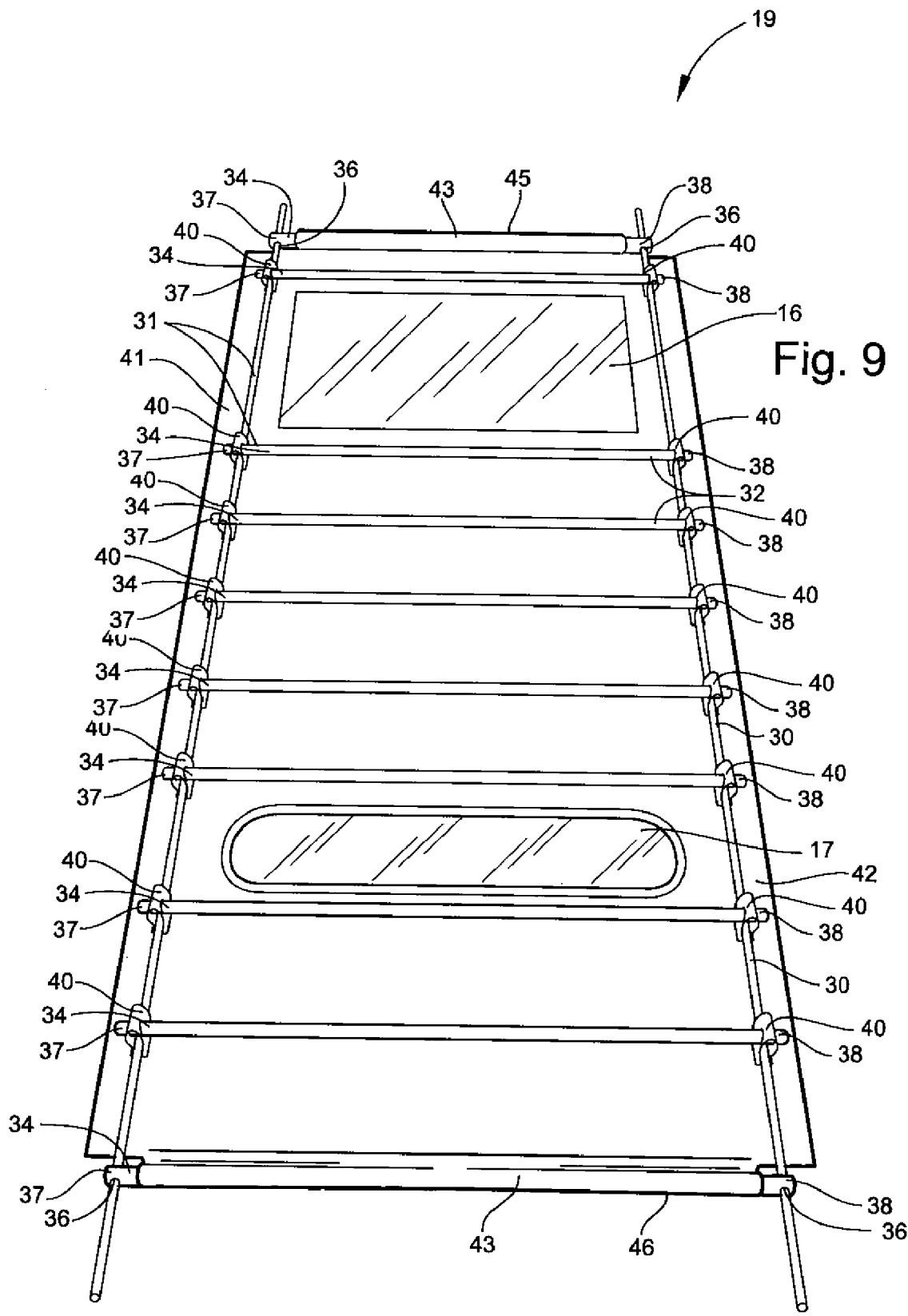
FIG. 9 shows the convertible top in an assembled, uninstalled position.
Figure 10:
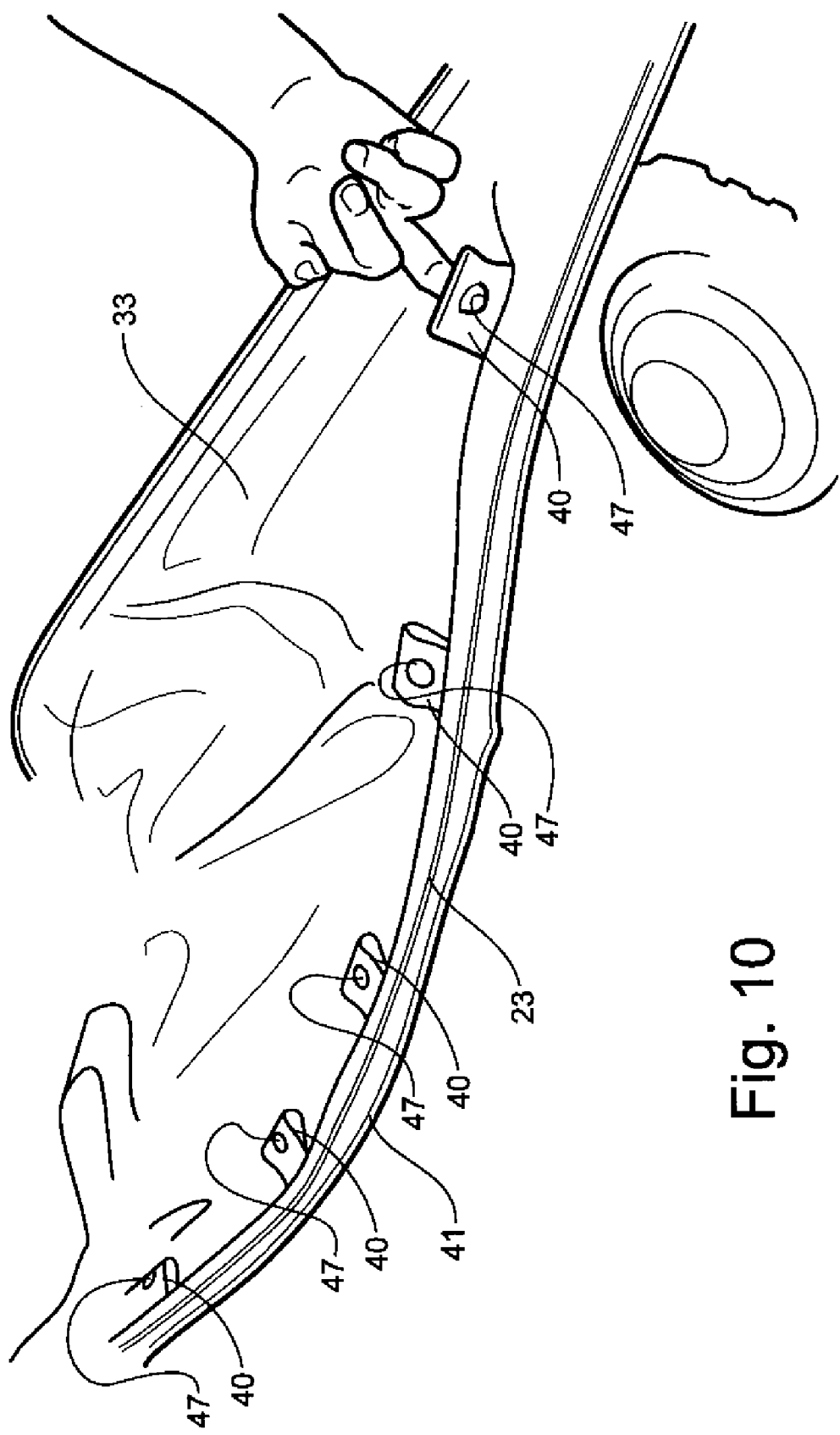
FIG. 10 shows the rectangular cover of the convertible top with a connecting means for securing the cover to the skeletal frame.
Figure 11:
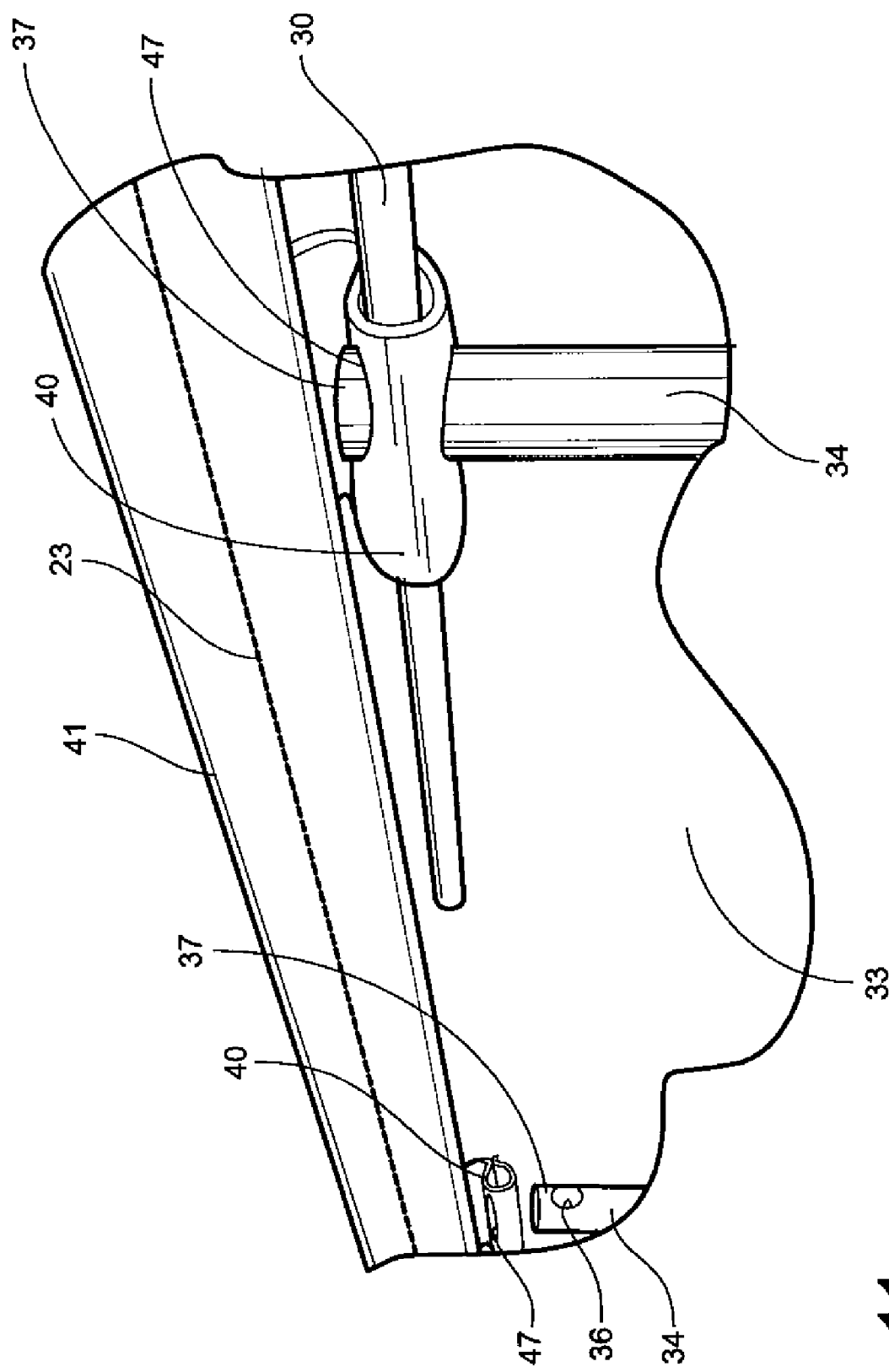
FIG. 11 shows the skeletal frame being secured to the connecting means of the rectangular cover.

The cover 33 also includes integrated end pockets 43 formed along opposed end edges 45 and 46 of the cover 33, as illustrated in FIG. 9. The end pockets 43 run the length along the end edges 45 and 46 to support an elongate cross-member 34 passing therethrough.

The canopy 19 is assembled by attaching the cross-members 34 and side members 30 to the cover 33. The connecting means 40, as illustrated in FIGS. 9, 10, 11, and 12, is a plurality of open-ended pockets formed from the same material as the cover 33. The pockets 40 allow the side members 30 to pass therethrough, and include a hole 47 transverse to each of the pockets 40 and passing therethrough for accepting the cross-members 34.

Figure 12:
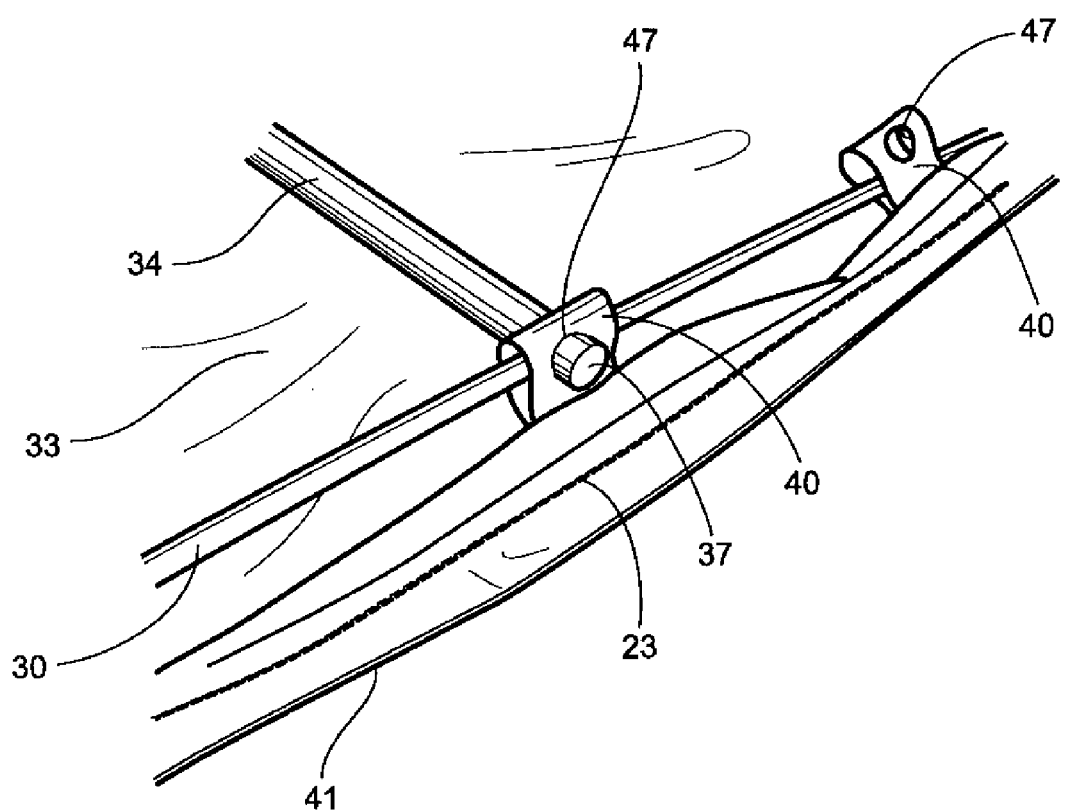
FIG. 12 shows the skeletal frame being secured to the connecting means of the rectangular cover.

To assemble the canopy 19, the cover 33 is laid onto a surface face down with the pockets 40, as illustrated in FIG. 9, facing up. The cross-members 34 are inserted into the transverse holes 47 of the pockets 40 along opposed side edges 41 and 42 of the cover 33. The cross-members 34 are positioned within the transverse holes 47 so that the holes 36 positioned on opposed ends 37 and 38 of the cross-members 34 are in alignment for allowing the side members 30 to pass through the pockets 40 and the holes 36 in the cross-members 34. The side members 30 are then slid through the pockets 40 and corresponding holes 36 of each cross-member 34, as illustrated in FIG. 12, creating a secure joint between the cover 33, the cross-members 34, and the side members 30.

Figure 14A:
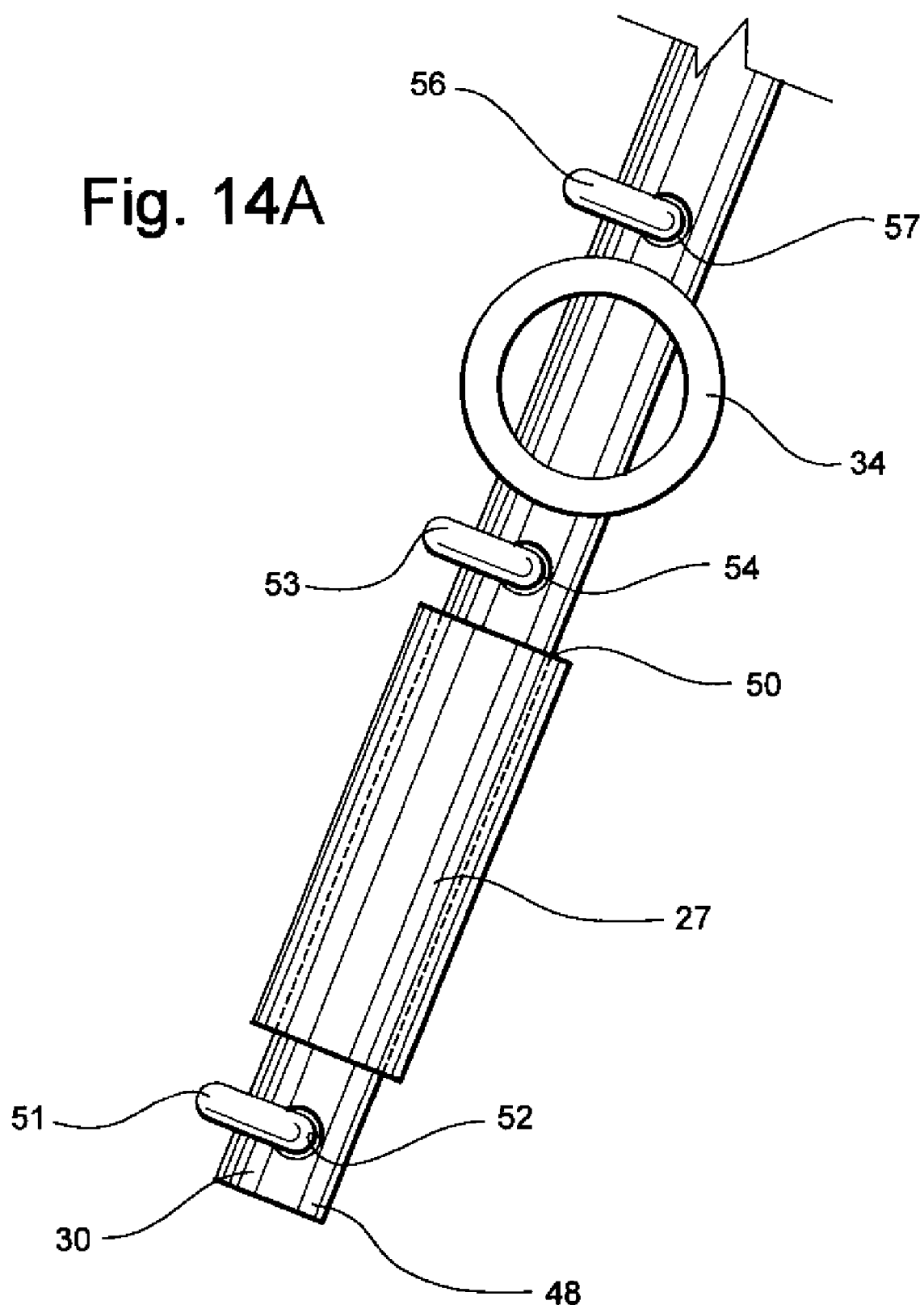
FIG. 14A shows the elongated side member of the skeletal frame attached to the attachment means by a pair of cotter pins and an elongated cross-member located on an end edge of the rectangular cover being secured in position.

The convertible top 10 is attached to the ATV 11 by positioning opposed ends 48 and 49 of the side members 30 into the respective openings 50 of the vertical tubular members 27 of the mounting bracket 14 and sliding the opposed ends 48 and 49 therethrough. A securing means such as a cotter pin 51, is secured within a hole 52 located on each of the opposed ends 48 and 49 of the side members 30 just below the vertical tubular members 27 of the mounting bracket 14 to prevent the side members 30 from withdrawing from the mounting bracket 14. Another cotter pin 53 is secured within a hole 54 located on each of the opposed ends 48 and 49 of the side members 30 just above the vertical tubular members 27 of the mounting bracket 14 to prevent the side members 30 from protruding through the mounting bracket 14 further than necessary for attachment of the canopy 19. A cotter pin 56 may also be secured within a hole 57 located on each of the ends 48 and 49 of the side members 30 just above the elongated pocket 43 and cross-member 34 combination, described above, to prevent the canopy 19 from retracting, as illustrated in FIG. 14A. Additionally, hooks, bungee cords, tie-down straps, or any other suitable securing device may be attached to the side curtains 18 and canopy 19. These securing devices hook onto the ATV 11 to provide an additional means for securing the side curtains 18 and convertible top 10 to the ATV 11.

With the canopy 19 assembled and the side members 30 secured within the mounting bracket 14, the canopy 19 is now ready to be positioned by the operator to several desired positions.

As shown in FIG. 18, a side curtain extension 70 may be attached to the bottom 21 of the side curtain 18 to provide protection to the operator of the ATV 11 from mud and debris entering the foot well of the ATV 11. The extension 70 may be attached to the side curtain using any suitable fastener, such as a zipper, buttons, and snaps. In the alternative, as shown in FIG. 19, a side curtain 118 may be used in place of side curtain 18. Side curtain 118 provides a one-piece side curtain that extends into the foot well of the ATV 11.

Referring to FIGS. 20 and 21, the convertible top 10 may also be used as a hunting blind. Like the tent shown in FIG. 2, the convertible top 10 is removed from the ATV 11 and positioned on the ground. Extension rods 72 are then attached to the side members 30 to raise the convertible top 10 to a height sufficient to allow an individual to stand under. As shown in FIG. 21, side curtains 18 are then attached to the canopy 19. A skirt 74 is then attached to the canopy 19 and side curtains 18 to completely enclose the individual. In the event an operator of the ATV 11 must hunt from the ATV 11, a camouflaged canopy (not shown) may be positioned and secured over the convertible top 10.

Figure 16:
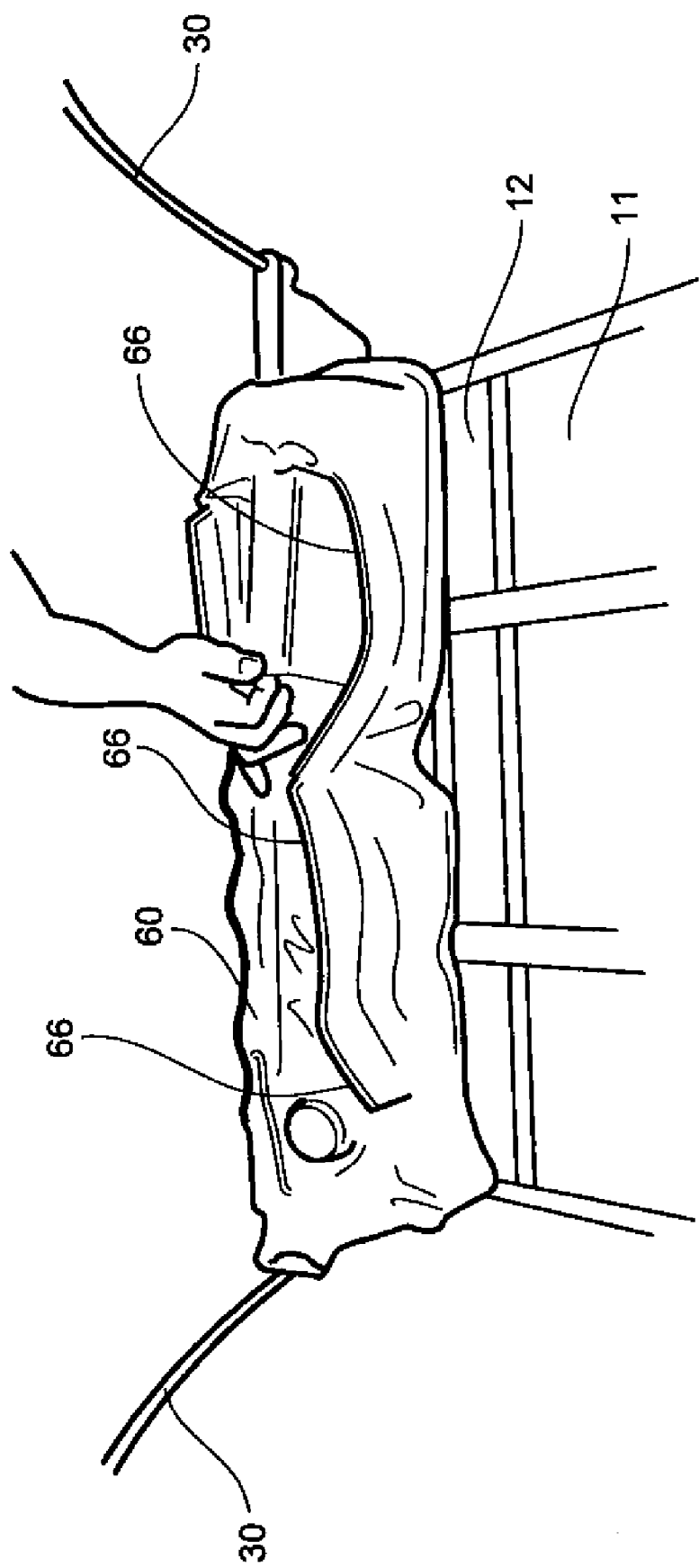
FIG. 16 shows the storage cover with storage pockets.
Figure 17:
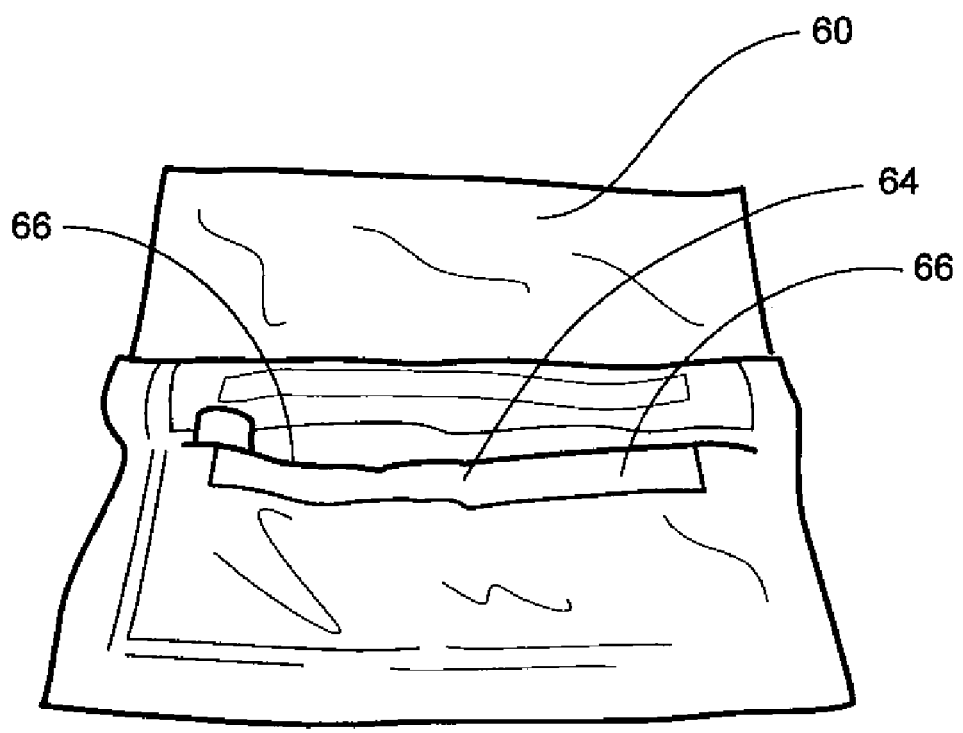
FIG. 17 shows the storage cover.

Referring now to FIGS. 15, 16, and 17, a storage cover 60 is used to secure the fully retracted convertible top 10. The storage cover 60 may be formed of any suitable fabric or other sheet material. The storage cover 60 also includes a plurality of pockets 66 for storing tools, beverages, and food. The storage cover 60 is wrapped around the fully retracted canopy 19 and secured in place by hook and loop fasteners, buttons, snaps, or any other suitable method for securing the storage cover 60 around the convertible top 10.

A convertible protective enclosure is described above. Various details of the invention may be changed without departing from its scope. Furthermore, the foregoing description of the preferred embodiments of the invention and the best mode for practicing the invention are provided for the purpose of illustration only and not for the purpose of limitation, the invention being identified in the claims.

We claim:

1. A convertible protective top, comprising:
   (a) a retractable canopy having at least two spaced-apart side members, at least two spaced-apart cross members positioned between and slidably engaged with the side members, and a flexible cover attached to the cross-members; and
   (b) wherein the cross-members and cover are adapted for being moved along the side members as desired to retract or extend the cover.

2. The convertible top according to claim 1, and further including an attachment means for securing the canopy to a vehicle.

3. The convertible protective top according to claim 2, wherein the attachment means includes generally vertical tubular members for receiving respective ones of the side members.

4. The convertible top according to claim 1, and further including extension rods for receiving ends of the side members and securing the canopy to the ground to provide a shelter.

5. The convertible top according to claim 4, and further including a skirt for enclosing the shelter.

6. The convertible protective top according to claim 1, wherein the cross-members include at least one hole positioned on opposing ends of the cross-members for allowing the cross-members to slidably engage the side members.

7. The convertible protective top according to claim 1, and further including a pair of side curtains for enclosing the protective top.

8. The convertible protective top according to claim 7, wherein the cover further includes at least one fastener positioned on each of a pair of opposing side edges for attaching a respective one of the side curtains to each side edge.

9. The convertible protective top according to claim 7, and further including side curtain extensions attached to a bottom of the side curtains to extend the length of the side curtains and provide additional protection.

10. The convertible protective top according to claim 1, wherein the cover further includes at least one connector positioned on each of a pair of opposing side edges for slidably attaching the cover to the side members.

11. The convertible protective top according to claim 10, wherein the at least one connector includes a hole transverse to the connector for receiving a respective one of the cross-members and allowing a respective one of the side members, the connector, and the cross-member to be connected together.

12. The convertible protective top according to claim 1, wherein the side members are flexible for allowing the canopy to assume an arcuate shape defining a distance less than the length of the side member.

13. The convertible protective top according to claim 1, wherein the side members are made of flexible rods.

14. The convertible protective top according to claim 1, wherein the side members are made of a plurality of rod segments connected by shock cords.

15. The convertible protective top according to claim 1, wherein the cover includes a front window and a rear window for providing an operator of the vehicle with a clear view.

16. A convertible protective top for being attached to a vehicle, comprising:
   (a) a retractable canopy, the canopy comprising:
      (i) at least two spaced-apart side members;
      (ii) at least two spaced-apart cross-members, wherein the cross-members are positioned between and slidably engaged with the side members;
      (iii) a flexible cover attached to the cross-members, wherein the cross-members and cover are adapted for being moved along the side members as desired to retract or extend the cover; and
   (b) attachment means for securing the canopy to a front end and a rear end of the vehicle.

17. The convertible protective top according to claim 16, wherein the cross-members include at least one hole positioned on opposing ends of the cross-members for allowing the cross-members to slidably engage the side members.

18. The convertible protective top according to claim 16, wherein the cover further includes at least one fastener positioned on each of a pair of opposing side edges for attaching a side curtain to each side edge and forming an enclosure, and wherein the at least one fastener is selected from the group consisting of a zipper, a button, and a snap.

19. The convertible protective top according to claim 16, wherein the cover further includes a hole transverse to the connector for receiving a respective one of the cross-members and allowing a respective one of the side members, the connector, and the cross-member to be connected together.

20. The convertible protective top according to claim 16, wherein the side members are flexible for allowing the canopy to assume an arcuate shape when positioned on the vehicle and attached between the front end and the rear end of the vehicle defining a distance less than the length of the side member.

21. The convertible protective top according to claim 16, wherein the cover includes a front window and a rear window for providing an operator of the vehicle with a clear view.

22. A convertible protective top for being attached to a vehicle, comprising:
   (a) an arcuate retractable canopy, the canopy comprising:
      (i) at least two spaced-apart flexible side members;
      (ii) a plurality of spaced-apart cross-members positioned between the side members, the cross-members having a hole positioned on opposing ends of the cross-members for slidably engaging the side members;
      (iii) a flexible cover including opposing side edges and opposing end edges, wherein each of the opposing side edges is slidably attached to a respective one of the side members by at least one pocket, and wherein each of the opposing end edges is attached to a respective one of the cross-members; and
   (b) attachment means for securing the canopy to a front end and a rear end of the vehicle.

23. The convertible protective top according to claim 22, wherein the attachment means comprises at least two mounting brackets, each of the mounting brackets including at least two generally vertical tubular members for receiving respective ones of the side members and securing the canopy to the vehicle.

24. The convertible protective top according to claim 23, wherein the side members are secured to the mounting brackets by a cotter pin.

25. The convertible protective top according to claim 22, wherein the pocket includes a hole transverse to the pocket for receiving a respective one of the cross-members and allowing a respective one of the side members, pocket, and cross-member to be connected together.

26. The convertible protective top according to claim 22, wherein the cover further includes a zipper disposed on each of the opposing side edges for attaching a side curtain to each side edge and forming an enclosure.

27. A method of attaching a convertible protective top to a vehicle, comprising the steps of:
   (a) providing a retractable canopy, the canopy comprising:
      (i) at least two spaced-apart side members;
      (ii) at least two spaced-apart cross-members, wherein the cross-members are positioned between and slidably engaged with the side members;
      (iii) a cover attached to the cross-members, wherein the cross-members and cover are moved along the side members to retract the cover; and
   (b) providing an attachment means for securing the canopy to the vehicle;
   (c) sliding opposing ends of each side member through an opening of the attachment means; and
   (d) inserting a connecter through a hole in the opposing ends of each side member.

28. The method according to claim 27, wherein the attachment means includes a plurality of generally vertical tubular members positioned on a front end and a rear end of the vehicle.

* * * * *